United States Patent [19]

Matsushima et al.

[11] Patent Number: 4,821,685
[45] Date of Patent: Apr. 18, 1989

[54] SUCTION DEVICE OF ENGINE

[75] Inventors: Atsushi Matsushima, Hamakita; Hideaki Ueda, Iwata, both of Japan

[73] Assignee: Yamaha Hatsudoki Kabushiki Kaisha, Iwata, Japan

[21] Appl. No.: 25,408

[22] Filed: Mar. 13, 1987

[30] Foreign Application Priority Data

Mar. 14, 1986 [JP] Japan .................................. 61-55060

[51] Int. Cl.⁴ ........................................... F02M 35/10
[52] U.S. Cl. ............................ 123/52 MF; 123/52 M
[58] Field of Search ............... 123/52 M, 52 MF, 337, 123/403, 198 E, 52 MB

[56] References Cited

U.S. PATENT DOCUMENTS 3,724,822 4/1973 Mambu et al. ..................... 123/403
3,814,069 6/1974 Croft et al. ....................... 123/52 M
4,622,926 11/1986 Rutschmann et al. ........ 123/52 MB Primary Examiner—Willis R. Wolfe
Assistant Examiner—M. Macy
Attorney, Agent, or Firm—Ernest A. Beutler

[57] ABSTRACT

Two embodiments of induction systems for internal combustion engines that improve mid range performance by providing a reflective device in the air inlet for the induction system that reflects negative pressure pulses back into the induction system so as to balance the pressure and reduce the deleterious effects of pulsations. In one embodiment, the reflective device is a fixed obturating member while in the other embodiment, the reflective device is an adjustably positioned valve member that is positioned in response to engine operating conditions such as engine speed.

9 Claims, 4 Drawing Sheets

SUCTION DEVICE OF ENGINE

BACKGROUND OF THE INVENTION

This invention relates to a suction device for an engine and more particularly to an improved engine induction system.

A common form of induction system for an internal combustion engine includes a first intake passage that extends from the intake port of the engine to a plenum chamber and a second passage that extends from the plenum chamber and which forms an atmospheric air inlet. Frequently, the plenum chamber is the body of an air cleaner for filtering foreign objects from the inducted air. It has been found that this type of system can result in poor running at mid ranges. This poor running results in a torque curve that is not as flat as desirable and also in reduced mid range power. It has been found that these conditions are the result of incomplete combustion in the combustion chamber.

The inventors have discovered that the reason for this is that the sequential opening and closing of the intake port, be it a ported construction as in a two-cycle engine or a valved construction as in a four-cycle engine, causes negative pressure pulses to propagate through the induction system to the air inlet which, at certain engine speeds, synchronize with the characteristic frequency of the induction system and cause resonations. These resonations generate large pressure variations in the plenum chamber and substantially decrease the volumetric efficiency of the engine. In addition to diminishing the volumetric efficiency of the engine, these pulsations in the induction system cause irregularities in the mixture strength delivered either by the carburetor or the fuel injection system and, accordingly, the emissions of unwanted exhaust gas constituents is also increased.

It is, therefore, a principal object of this invention to provide an improved induction system for an internal combustion engine.

It is a further object of this invention to provide an induction system for an internal combustion engine in which pulsations in the inlet system are dampened.

It is a further object of this invention to provide an improved induction system for an engine embodying a plenum chamber wherein pulsations in the plenum chamber are substantially reduced under all running conditions.

SUMMARY OF THE INVENTION

This invention is adapted to be embodied in an induction system for an internal combustion engine having an inlet port for sequentially admitting a charge to a variable volume chamber of the engine. A first conduit extends from the inlet port to a planum chamber and a second conduit extends from the plenum chamber and provides an atmospheric air inlet. In accordance with the invention, means are adapted to extend across a portion protion of the atmospheric air inlet for reflecting pulses emanating from the opening and closing of the inlet port back into the induction system for reducing pulsations in the induction system.

DETAILED DESCRIPTION OF THE PREFERRED EMBODIMENTS

Figure 1:
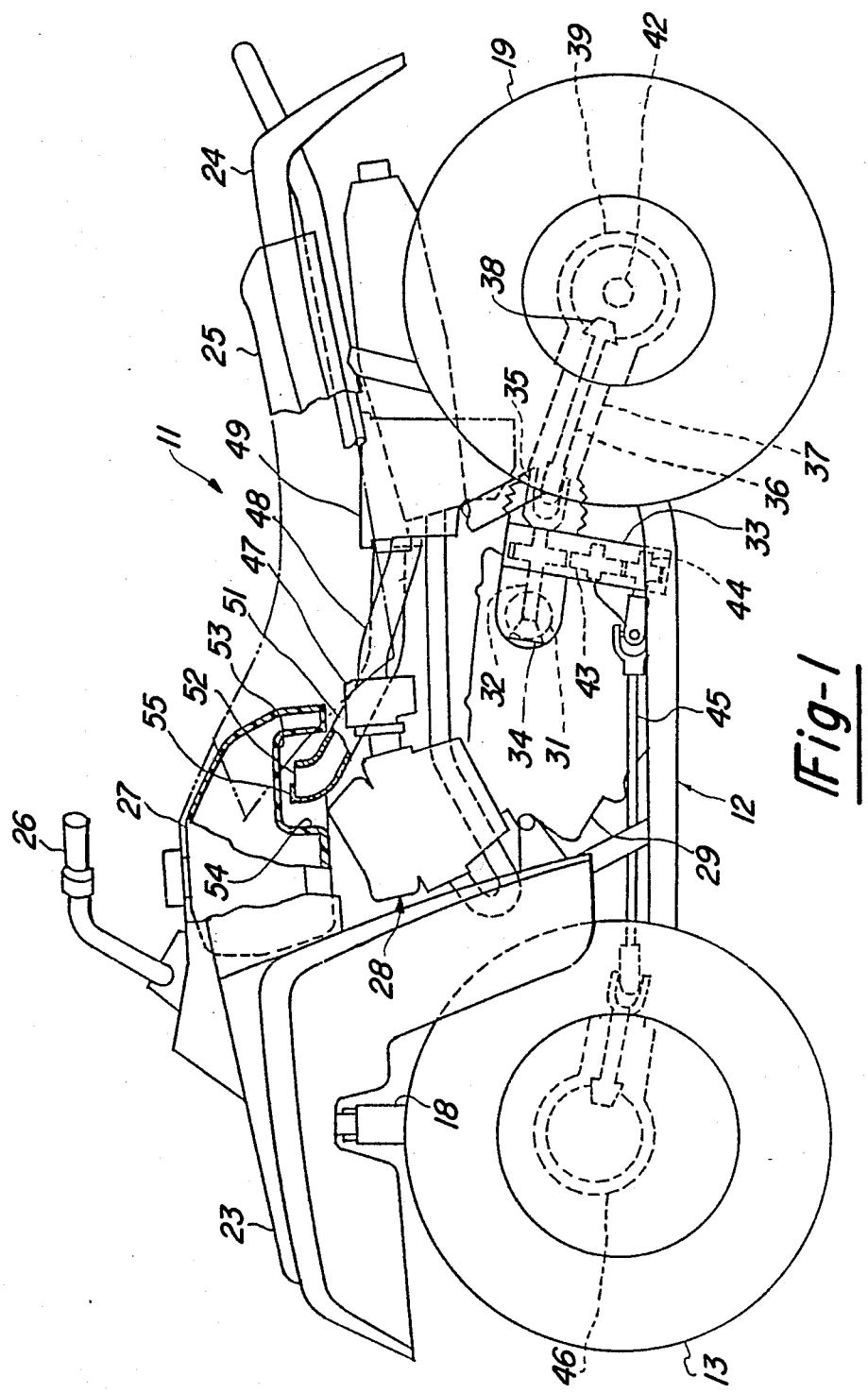
FIG. 1 is a side elevational view of a motor vehicle constructed in accordance with a first embodiment of the invention, with a portion broken away.
Figure 2:
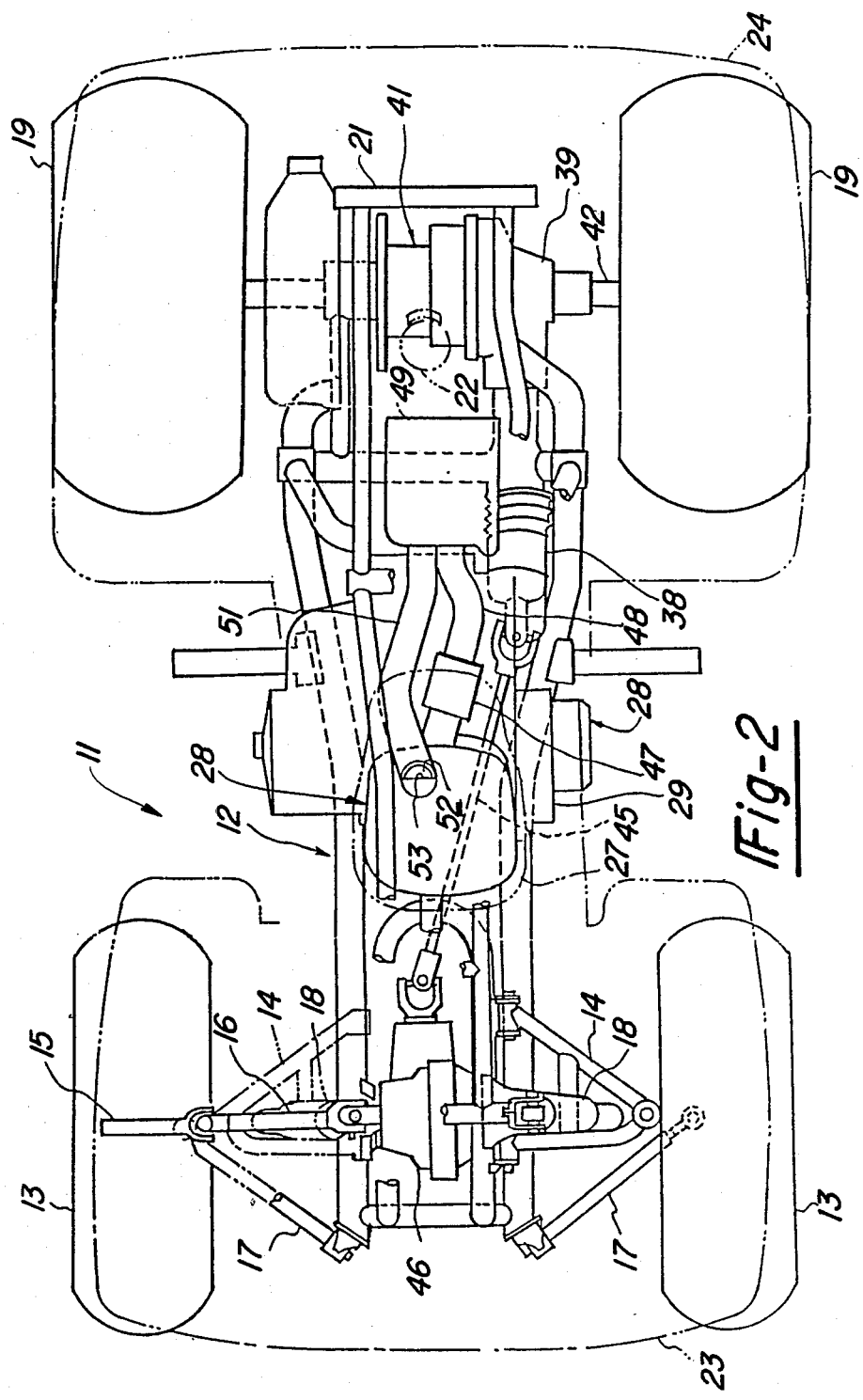
FIG. 2 is a top plan view of the vehicle, with portions shown in phantom.

Referring first to FIGS. 1 and 2, a motor vehicle of the four wheel type and powered by an internal combustion engine having an induction system constructed in accordance with an embodiment of the invention is identified generally by the reference numeral 11. The vehicle 11 includes a welded up tubular frame assembly 12 and a pair of driven front wheels 13 are carried at the forward end of the frame assembly by means of a suspension system. This suspension system for each wheel includes an upper arm 14 that is pivotally supported at its inner end on the frame 12 in a known manner and which carries a hub carrier 15 at its outer end. The lower end of the hub carrier 15 is supported by means of a pivotally supported drive shaft 16 and a tension link 17. Suspension movement of the front wheels 13 is controlled by means of a spring (not shown) and a pair of tubular shock absorbers 18.

The vehicle 11 further includes a pair of driven rear wheels 19 that are carried by a suitable suspension system. The suspension system comprises a trailing arm assembly 21 that is pivotally supported at its forward end on the frame 12 in any suitable manner. The suspension movement of the trailing arm 21 and rear wheels 19 is controlled by a rear spring (not shown) and a single tubular shock absorber 22.

In a preferred form, the wheels 13 and 19 may carry large low pressure balloon type tires so as to adapt the vehicle 11 to off the road use.

A body comprised of a front fender assembly 23, rear fender assembly 24 and seat 25 is carried on the frame 12. The seat 25 is designed so as to plrimarily accommodate a single rider seated in straddled fashion. A handlebar assembly 26 is pivotally supported at the forward end of the seat 25 by the frame 12 and operates a steering mechanism (not shown) for steering the front wheels 13. In addition, a molded plastic fuel tank 27 is carried by the frame assembly 12 just aft of the handlebar assembly 26.

The vehicle 11 is powered by an internal combustion engine, indicated generally by the reference numeral 28, and which may comprise a single cylinder motorcycle type of engine. As such, the engine 28 is provided with a crankcase transmission assembly 29 in which the crankshaft (not shown) of the engine 28 is rotatably journaled and that contains a change speed transmission.

The change speed transmission within the crankcase transmission assembly 29 has an output shaft 31 that extends transversely of the vehicle 11 and which drives an input shaft 32 of a transfer gear mechanism, indicated generally by the reference numeral 33, via a bevel gear train 34. The transfer gear mechanism 33 has a first output shaft 35 that drives a drive shaft 36. The drive shaft 36 is journaled within a tube 37 of the trailing arm assembly 21, and, in turn, carries a pinnion gear 38 which drives a ring gear 39. The ring gear 39 is part of a final drive assembly 41 which drives rear axles 42 that drive the rear wheels 19.

Within the transfer gear mechanism 33, there is provided a transfer gear set 43 that drives a second output shaft 44. The output shaft 44 drives a diagonally extending shaft 45 which, in turn, drives a final drive assembly 46 for the front wheel shafts 16. A final drive 46 for the front wheels 13 includes a differential mechanism of any known type.

The portion of the vehicle as thus far described illustrates only a typical environment in which the invention may be found. For that reason, other details of the construction of the vehicle 11 are not necessary to understand the construction and operation of the invention.

The engine 28 is provided with an induction system that includes an intake port (not shown) that serves a chamber of the engine. If the engine 28 is of the two-cycle type, such an intake port will serve the crankcase of the engine through a ported arrangement. If the engine 28 is of the four-cycle type, the intake port will serve the combustion chamber with a flow controlling intake valve. Such constructions are well known in this art and for that reason illustration of them is not believed to be necessary. In the illustrated embodiment, a carburetor 47 supplies a fuel/air mixture to the engine intake port. The invention also has application with fuel injected engines as should be readily apparent to those skilled in the art. The carburetor, in turn, receives air through a first intake passage 48. The intake passage 48 extends to a plenum chamber 49 which, in a preferred embodiment of the invention, is an air cleaner assembly that is mounted beneath the seat 25 and to the rear of the engine 28.

Atmospheric air is delivered to the plenum chamber 49 through a second, inlet conduit 51. The conduit 51 extends from a portion in the plenum chamber 49 upstream of its filter element while the conduit 48 extends from a point downstream of the filter element. The conduit 51 extends forwardly and terminates in an upwardly extending air inlet opening 52 that is juxtaposed beneath a horizontally extending wall 53 forming a portion of a recess 54 in the lower side of the fuel tank 27. As a result, the atmospheric air inlet 52 will be sheltered from foreign material which is likely to be thrown up by the wheels 13 and 19 due to the off the road use of the vehicle.

It should be noted that the conduits 51 and 48 are generally cylindrical in configuration and have substantially the same cross-sectional flow area throughout their lengths.

It has been found that an engine having an induction system as thus far described may exhibit reduced torque and power at mid range conditions and somewhat unstable running. This has been found to be caused by the emanation of negative exhaust pulses during the opening and closing of the intake port of the engine pulses which are transferred back through the conduit 48 to the plenum chamber 49 at the speed of sound and from the plenum chamber 49 through the conduit 51 to the inlet opening 52 at this same speed. These pulsations cause pulsations in the pressure in the plenum chamber 49 and cause uneven running and the reduced performance as aforenoted, particularly if they match the normal resonance of the engine, as often is the case.

Therefore, in accordance with the invention, there is provided a reflective member 55 that extends across and obturates a portion of the inlet opening 52 of the conduit 51. The reflective plate 55, in a preferred embodiment of the invention, occupies one-half of the cross-sectional area of the inlet opening 52 and is semi-circular in shape. Other shapes, such as annular elements may be employed, however. It has been found that the pressure pulses that are generated in the induction system are reflected back off of this plate into the plenum chamber 49 in such a way as to balance out of the pulsations and to cause a more uniform pressure to exist in the plenum chamber 49. As a result, the performance is improved as may be seen by reference to FIG. 3.

Figure 3:
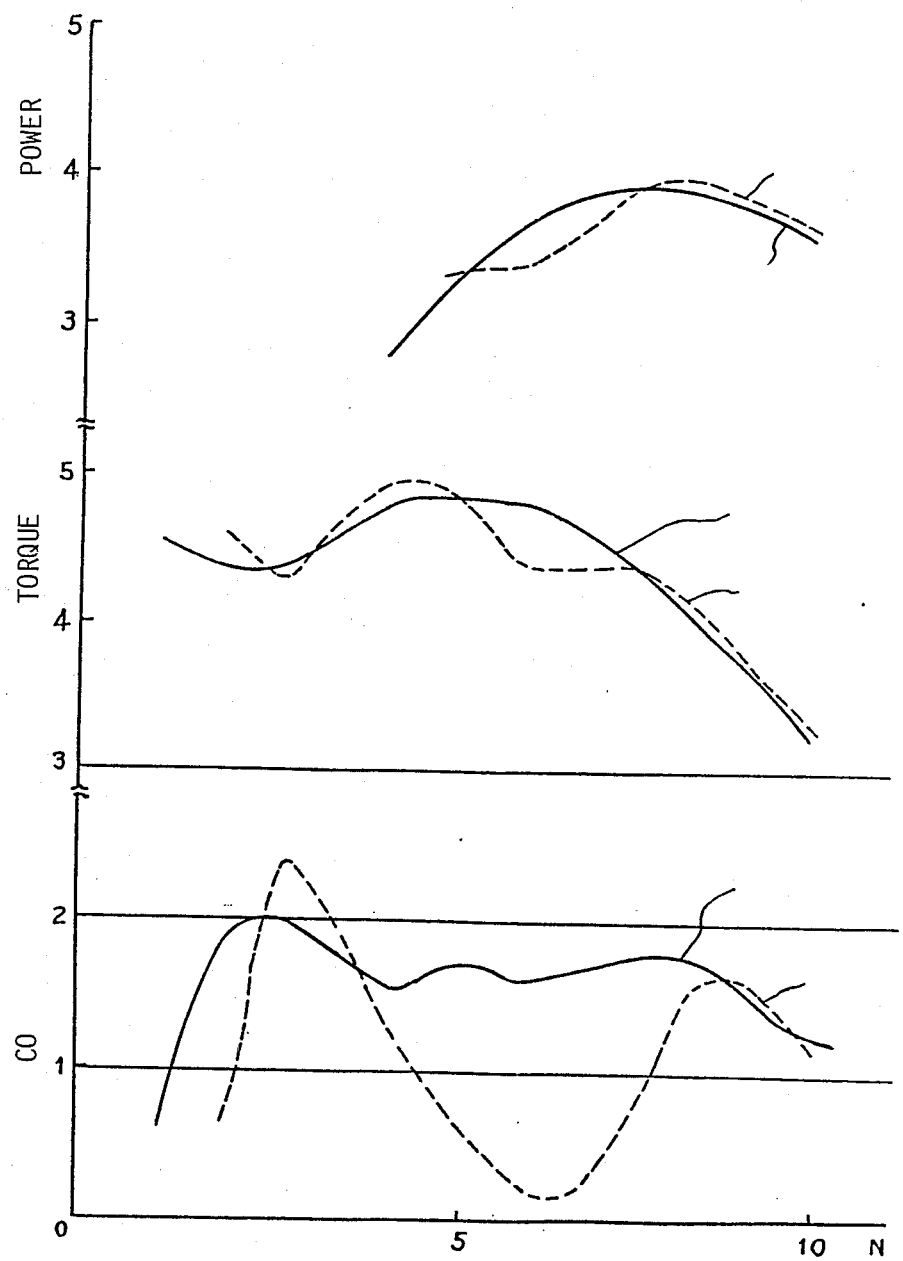
FIG. 3 is a graphical view showing the power torque and carbon monoxide exhaust gas constituents of a prior art engine and one constructed in accordance with the embodiment of FIGS. 1 and 2.

In FIG. 3, there are indicated on relative scales the power output of the engine, the torque of the engine and the amount of carbon monoxide present in the exhaust gases throughout the engine speed and load ranges. A conventional prior art induction system without the plate 55 is shown in the broken line curve while the performance of an engine with the reflective plate 55 is shown by the solid line curve. It may readily be seen that mid range torque and power are both down due to the pressure pulsations that occur in the plenum chamber 49 of the prior art systems. The reason for this may be understood by reference to the carbon monoxide curve wherein it is seen that the amount of carbon monoxide present in the exhaust gases under these same running conditions is substantially lower than with the reflective plate 55. The presence of low percentages of carbon monoxide indicates that there is uneven and substantially imcomplete combustion under these running conditions. However, the incorporation of the reflective plate so as to dampen these pulsations does significantly improve the performance as can well be seen.

Figure 4:
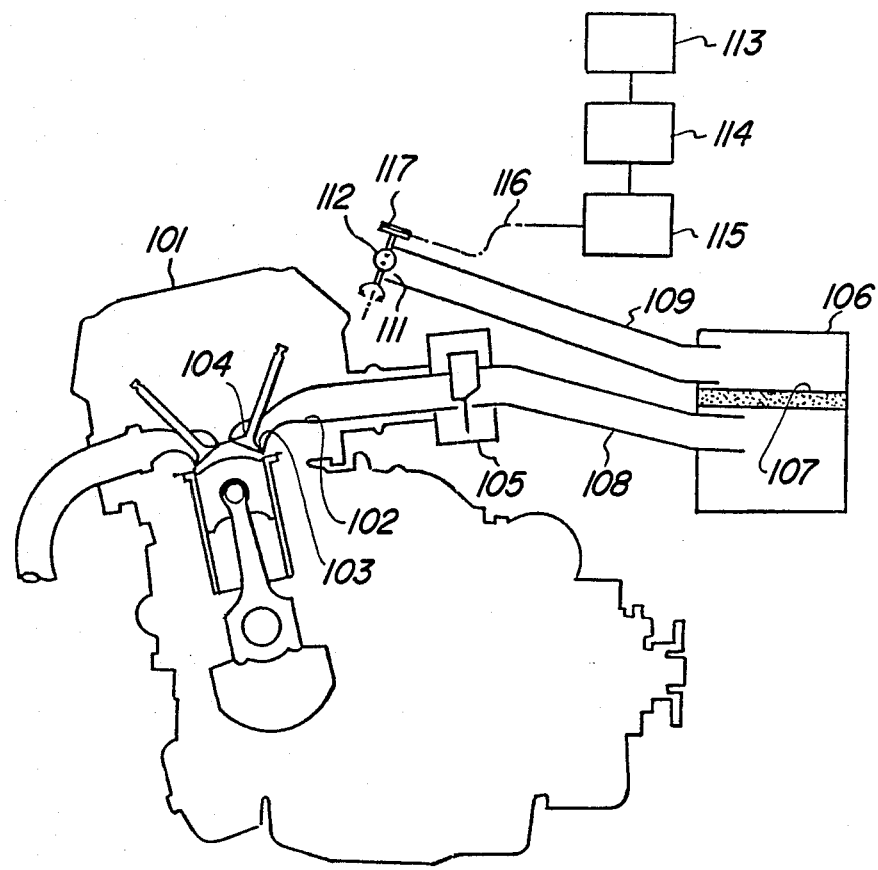
FIG. 4 is a partially schematic view showing an induction system for an internal combustion engine constructed in accordance with a second embodiment of the invention.

In the embodiment of FIGS. 1 and 2, the reflective plate 55 is a fixed plate that obturates a portion of the intake opening 52. However, as can be seen from the high end performance curves of FIG. 3, this obturation tends to slightly reduce the performance at maximum output. FIG. 4 shows another embodiment of the invention wherein the degree of obturation is changed in response to the changes in engine running characteristics and hence the improved mid range performance can be achieved without sacrificing maximum power output.

In this figure, an internal combustion engine incorporating this embodiment of the invention is identified generally by the reference numeral 101. As with the previously described embodiment, the engine 101 may be of either the two or four-cycle type and is preferably a motorcycle type of power unit that includes a combined crancase transmission assembly, although this is not essential to the invention. In FIG. 4, the engine 101 operates on the four stroke cycle principle and has an intake passage 102 that terminates in an intake port 103. A poppet type intake valve 104 that is operated in any suitable manner controls the opening and closing of the intake port 103 as is well known in this art.

A carburetor, indicated schematically at 105, delivers a fuel/air charge to the intake passage 102. As with the previous embodiment, this embodiment is equally applicable to fuel injected engines. The carburetor 105 draws an air charge from a plenum chamber 106 which, in the illustrated embodiment, comprises an air filter housing having a filter element 107. A first intake conduit 108 connects the plenum chamber 106 with the carburetor 105 downstream of the filter element 107.

A second intake conduit 109 extends from an atmospheric inlet opening 111 into the plenum chamber 106 on the upstream side of the filter element. In accordance with the invention, a variable throttle valve 112 is provided in the inlet 111 for obturating the flow and for providing the reflective member for reducing the pressure pulses under certain running conditions. As with the previously described embodiment, the valve 112 is designed so as to obstruct appropriately one-half of the cross-section flow area when the valve member 112 is in its fully closed position. This may be accomplished by having the valve member 112 have a smaller diameter than the diameter of the induction passage 109. Like the previously described embodiment, the induction passages 108 and 109 have a substantially uniform cross-sectional area throughout their length and are generally cylindrical in configuration.

An arrangement is provided for automatically controlling the throttle valve 112 in response to engine running conditions. For this purpose, there is provided an engine running condition indicator 113 which may be a speed indicator that is responsive to the ignition circuit of the engine. The speed indicator 113 outputs a speed signal to a control circuit 114 that is preprogrammed so as to actuate a servo motor 115 to the desired position. The servo motor 115 controls the throttle valve 112 through a flexible cable 116 and pulley 117 that is affixed to the shaft of the throttle valve 112. Thus, the throttle valve 112 is positioned in a fully closed condition when the reflective action of it is desired and is fully opened at maximum engine speed so as to not reduce engine power output.

It should be readily apparent from the foregoing description that two embodiments of the invention has been illustrated and described, each of which provides good engine running and reduces the likelihood of poor performance under mid range conditions. Although two embodiments of the invention have been illustrated and described, various changes and modifications may be made without departing from the spirit and scope of the invention, as defined by the appended claims.

We claim:

1. In an induction system for an internal combustion engine having an inlet port for admitting a charge to a variable volume chamber of said engine, a first conduit extending from said inlet port to a plenum chamber, means for sequential opening and closing said inlet port for generating pulses in said first conduit means, a second conduit extending from said plenum chamber and providing the sole atmospheric air inlet to said plenum chamber and reflective means adapted to extend across a portion of said atmospheric air inlet for reflecting pulses emanating from the opening and closing of said inlet port back into said induction system for reducing pulsations in said induction system.

2. In an induction system as set for in claim 1 wherein the reflective means occupies approximately one-half of the effective cross-sectional area of the atmospheric air inlet.

3. In an induction system as set forth in claim 1 wherein the reflective means extends perpendicular to the portion of the atmospheric air inlet.

4. In an induction system as set forth in claim 3 wherein the reflective means occupies approximately one-half of the effective cross-sectional area of the atmospheric air inlet.

5. In an induction system as set forth in claim 4 wherein the reflective means is fixed relative to the atmospheric air inlet.

6. In an induction system as set forth in claim 4 wherein the reflective means is movable relative to the atmospheric air inlet.

7. In an induction system as set forth in claim 1 wherein the reflective means is movable relative to the atmospheric air inlet.

8. In an induction system as set forth in claim 7 wherein the reflective means is moved in response to an engine running condition.

9. In an induction system as set forth in claim 8 wherein the reflective means occupies approximately one-half of the effective cross-sectional area of the atmospheric air inlet in its fully closed position.

* * * * *